(12) United States Patent
Toda

(10) Patent No.: US 9,930,345 B2
(45) Date of Patent: Mar. 27, 2018

(54) IMAGE ENCODING APPARATUS, IMAGE ENCODING METHOD, AND IMAGE ENCODING PROGRAM

(71) Applicant: SOCIONEXT INC., Yokohama-shi, Kanagawa (JP)

(72) Inventor: Kyousuke Toda, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 194 days.

(21) Appl. No.: 14/871,534

(22) Filed: Sep. 30, 2015

(65) Prior Publication Data
US 2016/0100181 A1 Apr. 7, 2016

(30) Foreign Application Priority Data
Oct. 7, 2014 (JP) .................................. 2014-206576

(51) Int. Cl.
| | | |
|---|---|---|
| *H04N 19/44* | (2014.01) | |
| *H04N 19/87* | (2014.01) | |
| *H04N 19/85* | (2014.01) | |
| *H04N 19/172* | (2014.01) | |
| *H04N 19/174* | (2014.01) | |
| *H04N 19/107* | (2014.01) | |

(52) U.S. Cl.
CPC ......... *H04N 19/174* (2014.11); *H04N 19/107* (2014.11)

(58) Field of Classification Search
CPC .......................... H04N 19/174; H04N 19/107
See application file for complete search history.

(56) References Cited

U.S. PATENT DOCUMENTS

| | | | |
|---|---|---|---|
| 5,805,222 A | 9/1998 | Nakagawa et al. | |
| 2004/0066854 A1* | 4/2004 | Hannuksela ........... | H04N 19/70 375/240.27 |
| 2008/0260266 A1* | 10/2008 | Tsukuda ............... | H04N 19/172 382/232 |

FOREIGN PATENT DOCUMENTS

| | | |
|---|---|---|
| JP | 09-271026 A | 10/1997 |
| JP | 2000-287207 A | 10/2000 |
| JP | 2004-147306 A | 5/2004 |

OTHER PUBLICATIONS

Kazuo Takada, "Cisco TelePresence/Video Technical Description," [online], Cisco Plus Japan 2011, [Access Date: Jul. 2, 2014], Internet URL <http://www.cisco.com/web/JP/event/ciscoplus2011/pdf/1C-5.pdf.>.

* cited by examiner

*Primary Examiner* — Christopher S Kelley
*Assistant Examiner* — Nasim Nirjhar
(74) *Attorney, Agent, or Firm* — Arent Fox LLP

(57) ABSTRACT

An image encoding apparatus, which is configured to perform image encoding based on a gradual decoder refresh scheme, includes a pre-processor configured to receive a video signal obtained by slicing one screen into a plurality of sub-screens and perform pre-processing, and an image encoder configured to receive output of the pre-processor, perform an encoding process, and generate stream data. The image encoder is configured to acquire information of a first Intra-slice corresponding to a target Intra-slice in a first sequence with respect to the target Intra-slice in a second sequence, in which encoding is performed, after the first sequence; and is configured to estimate an Intra-slice line number and an Inter-slice line number of the second sequence not to exceed a target information amount based on the acquired information of the first Intra-slice.

15 Claims, 10 Drawing Sheets

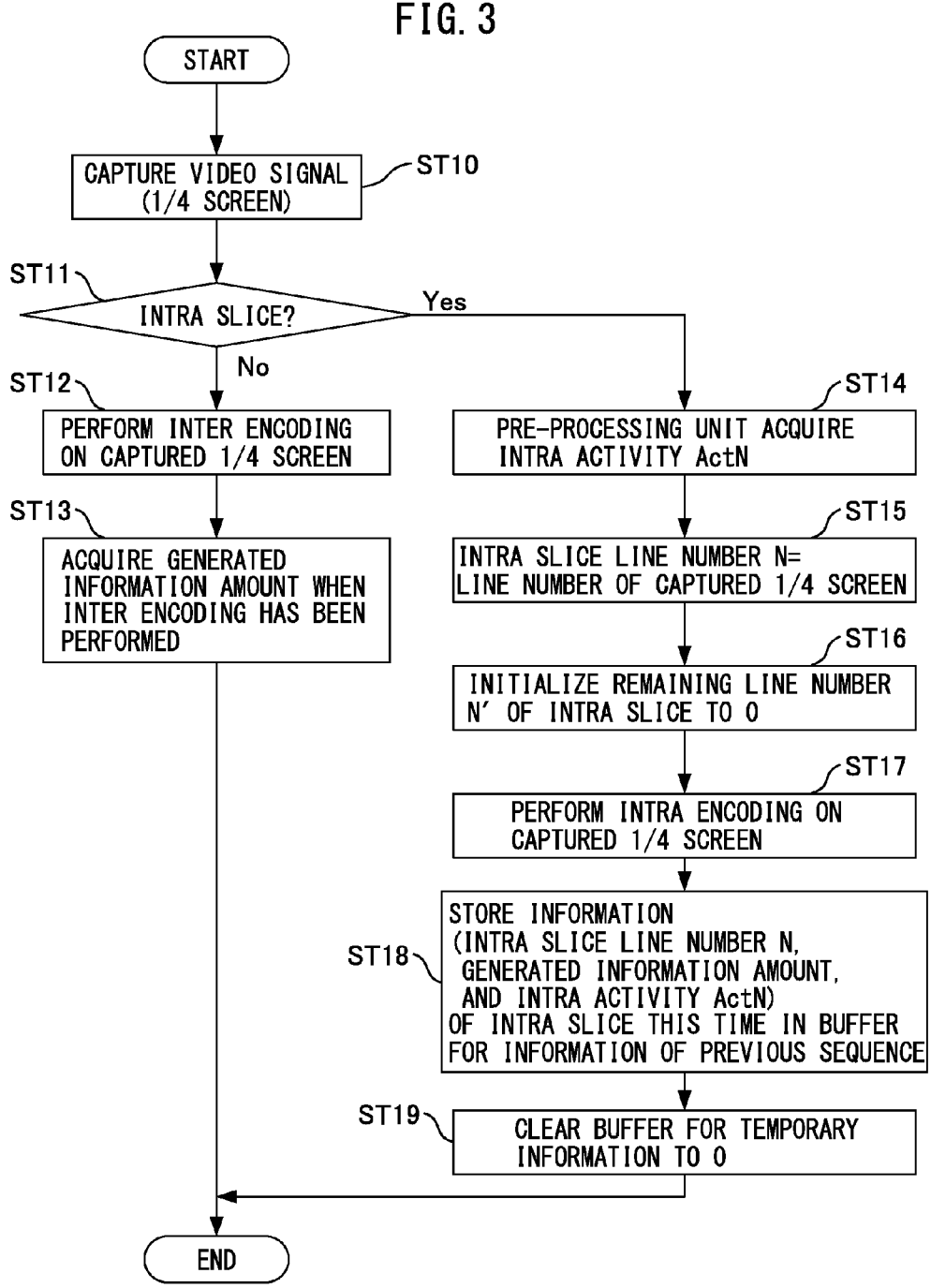

FIG. 4A

| SLICE POSITION | INTRA SLICE LINE NUMBER | GENERATED INFORMATION AMOUNT | INTRA ACTIVITY |
|---|---|---|---|
| SLICE 0 | $L_{intra}\text{-}0$ | $I_{intra}\text{-}0$ | $Act_{intra}\text{-}0$ |
| SLICE 1 | $L_{intra}\text{-}1$ | $I_{intra}\text{-}1$ | $Act_{intra}\text{-}1$ |
| SLICE 2 | $L_{intra}\text{-}2$ | $I_{intra}\text{-}2$ | $Act_{intra}\text{-}2$ |
| SLICE 3 | $L_{intra}\text{-}3$ | $I_{intra}\text{-}3$ | $Act_{intra}\text{-}3$ |

FIG. 4B

| SLICE POSITION | INTRA SLICE LINE NUMBER | GENERATED INFORMATION AMOUNT | INTRA ACTIVITY |
|---|---|---|---|
| SLICE X | $tmpL_{intra}\text{-}X$ ↓ CLEARED TO 0 | $tmpI_{intra}\text{-}X$ ↓ CLEARED TO 0 | $tmpAct_{intra}\text{-}X$ ↓ CLEARED TO 0 |

FIG. 6A

| SLICE POSITION | INTRA SLICE LINE NUMBER | GENERATED INFORMATION AMOUNT | INTRA ACTIVITY |
|---|---|---|---|
| SLICE 0 | $L_{intra}\text{-}0$ | $I_{intra}\text{-}0$ | $Act_{intra}\text{-}0$ |
| SLICE 1 | $L_{intra}\text{-}1$ | $I_{intra}\text{-}1$ | $Act_{intra}\text{-}1$ |
| SLICE 2 | $L_{intra}\text{-}2$ | $I_{intra}\text{-}2$ | $Act_{intra}\text{-}2$ |
| SLICE 3 | $L_{intra}\text{-}3$ | $I_{intra}\text{-}3$ | $Act_{intra}\text{-}3$ |

FIG. 6B

| SLICE POSITION | INTRA SLICE LINE NUMBER | GENERATED INFORMATION AMOUNT | INTRA ACTIVITY |
|---|---|---|---|
| SLICE X | $tmpL_{intra}\text{-}X$ | $tmpI_{intra}\text{-}X$ | $tmpAct_{intra}\text{-}X$ |

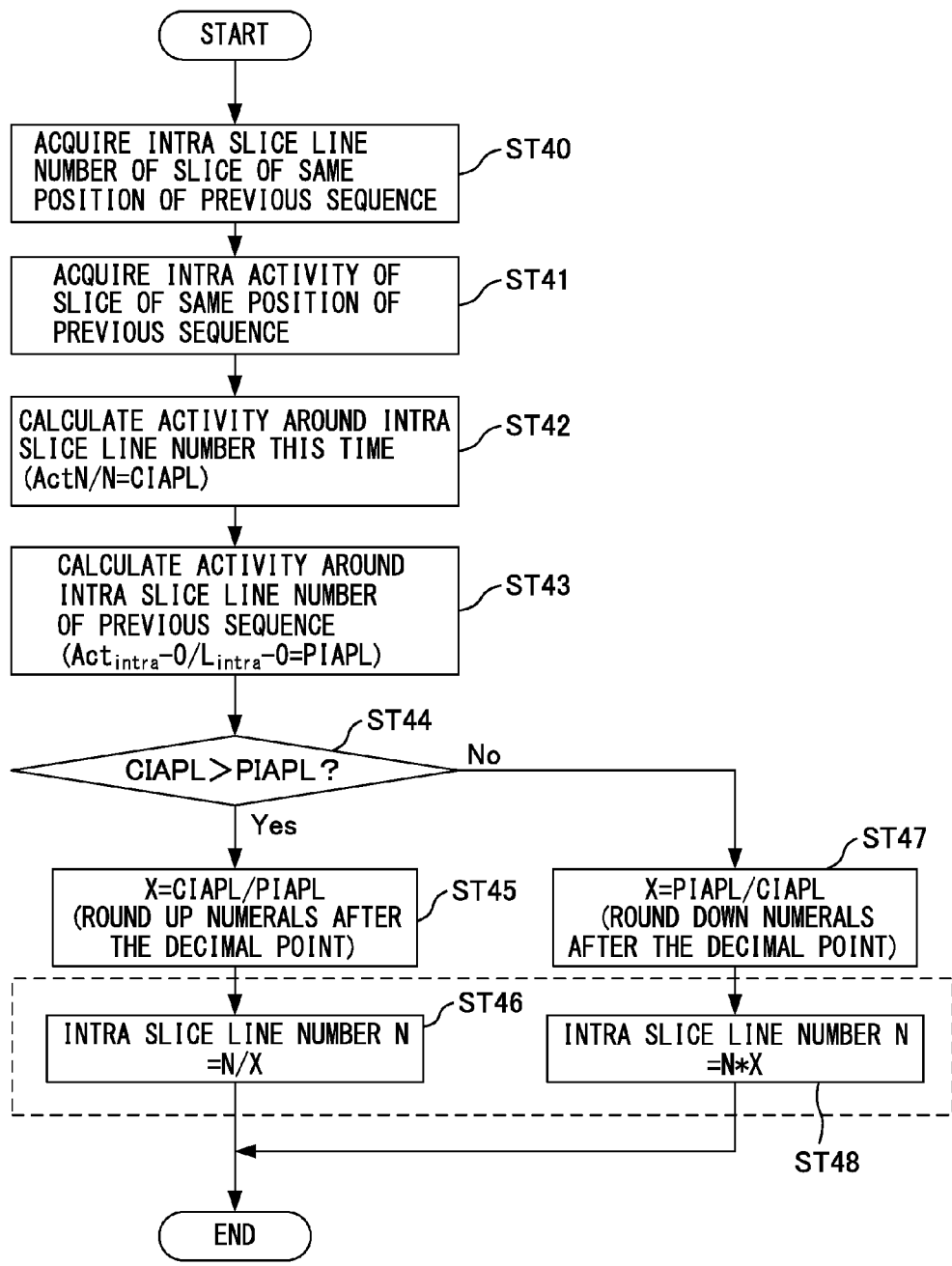

FIG. 8

| SLICE POSITION | INTRA SLICE LINE NUMBER D03 | GENERATED INFORMATION AMOUNT | INTRA ACTIVITY D04 |
|---|---|---|---|
| SLICE 0 | $L_{intra}\text{-}0$ | $I_{intra}\text{-}0$ | $Act_{intra}\text{-}0$ |
| SLICE 1 | $L_{intra}\text{-}1$ | $I_{intra}\text{-}1$ | $Act_{intra}\text{-}1$ |
| SLICE 2 | $L_{intra}\text{-}2$ | $I_{intra}\text{-}2$ | $Act_{intra}\text{-}2$ |
| SLICE 3 | $L_{intra}\text{-}3$ | $I_{intra}\text{-}3$ | $Act_{intra}\text{-}3$ |

IMAGE ENCODING APPARATUS, IMAGE ENCODING METHOD, AND IMAGE ENCODING PROGRAM

CROSS-REFERENCE TO RELATED APPLICATION

This application is based upon and claims the benefit of priority of the prior Japanese Patent Application No. 2014-206576, filed on Oct. 7, 2014, the entire contents of which are incorporated herein by reference.

FIELD

The embodiments discussed herein are related to an image encoding apparatus, an image encoding method, and an image encoding program.

BACKGROUND

In recent years, as a compression encoding scheme of moving image data, various schemes have been proposed and standardized. Furthermore, the compression encoding scheme is applied to wide usages from a low speed/low quality moving image of a video telephone of a cellular phone or a smart phone to a high quality moving image with large capacity of hi-vision television broadcasting, and is commercially used.

Meanwhile, for example, in a scheme of emphasizing low delay than image quality of a video conference system or a monitoring camera, for example, image encoding (low delay encoding) is performed based on a gradual decoder refresh (GDR) scheme.

In the GDR, for example, since serialization delay in a low speed link may cause arrival delay of a packet of an I (Intra-coded: Intra) frame or packet discard, intra-image data is divided into a plurality of frames (pictures) for transmission.

In addition, a GDR frame includes an intra-macroblock part (intra-slice: Intra-slice) and a predicted macroblock part (inter-slice: Inter-slice). Furthermore, when all GDR frames have been received, a decoder can completely refresh an image.

As described above, for example, in a video conference system or a monitoring camera, low delay encoding is realized based on the GDR scheme. Herein, encoding based on intra-prediction is limited to a part of an image, and shows a tendency to an increase in an information amount.

Although the intra has been limited to a part, when encoding is performed from an upper side to a lower side an image, for example, it may exceed an upper limit (a target information amount) of an information amount due to a communication speed.

As described above, when an information amount of an encoding result exceeds the target information amount, since the information is discarded or an intra-information amount is thinned out, resulting in the degradation of image quality.

By the way, in the past, various image encoding apparatuses, image encoding methods, and image encoding programs have been proposed.

Patent Document 1: Japanese Laid-open Patent Publication No. 2000-287207
Patent Document 2: Japanese Laid-open Patent Publication No. H09(1997)-271026
Patent Document 3: Japanese Laid-open Patent Publication No. 2004-147306

Non-Patent Document 1: Kazuo TAKADA, "Cisco Tele-Presence/Video Technical Description," [online], Cisco Systems, Inc., Solutions Systems Engineering, Consulting Systems Engineer, Cisco Plus Japan 2011, [Accessed on Jul. 2, 2014], Internet, <http://www.cisco.com/web/JP/event/ciscoplus2011/pdf/1C-5.pdf>

SUMMARY

According to an aspect of the embodiments, there is provided an image encoding apparatus, which is configured to perform image encoding based on a gradual decoder refresh scheme, includes a pre-processor configured to receive a video signal obtained by slicing one screen into a plurality of sub-screens and perform pre-processing, and an image encoder configured to receive output of the pre-processor, perform an encoding process, and generate stream data.

The image encoder is configured to acquire information of a first Intra-slice corresponding to a target Intra-slice in a first sequence with respect to the target Intra-slice in a second sequence, in which encoding is performed, after the first sequence; and is configured to estimate an Intra-slice line number and an Inter-slice line number of the second sequence not to exceed a target information amount based on the acquired information of the first Intra-slice.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a flowchart for explaining an example of a procedure in a sequence of first round;

FIG. 4A and FIG. 4B are diagrams for explaining a buffer process in a flowchart of FIG. 3;

FIG. 6A and FIG. 6B are diagrams for explaining a buffer process in a flowchart of FIG. 5;

FIG. 7 is a flowchart for explaining in more detail an Intra-activity correction process in a flowchart of FIG. 5;

FIG. 8 is a diagram for explaining a buffer process in a flowchart of FIG. 7;

DESCRIPTION OF EMBODIMENTS

Hereinafter, an embodiment of an image encoding apparatus, an image encoding method, and an image encoding program will be described in detail with reference to the accompanying drawings. In addition, the image encoding apparatus, the image encoding method, and the image encoding program of the present embodiment are applied to image encoding on a gradual decoder refresh (GDR) scheme.

Figure 1:
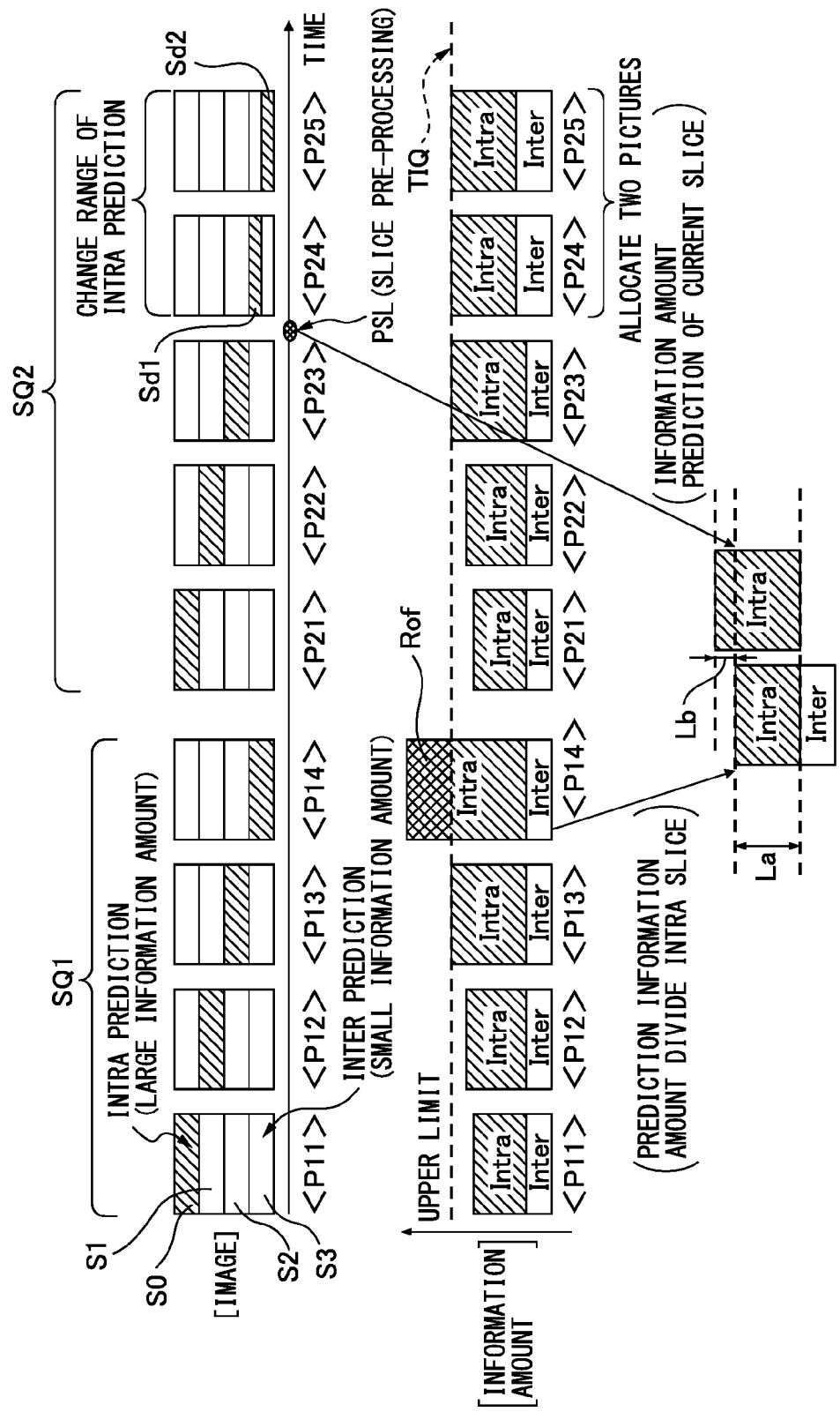
FIG. 1 is a diagram for explaining an example of an image encoding method according to the present embodiment.

FIG. 1 is a diagram for explaining an example of an image encoding method according to the present embodiment. Hereinafter, the case in which one image is divided (sliced) into four, an image signal (a video signal of a ¼ screen) sliced by ¼ is encoded, and a video stream is output will be described as an example.

In FIG. 1, a reference numeral SQ1 denotes a sequence (a first sequence) immediately before a sequence in which encoding is being performed, and a reference numeral SQ2 denotes the sequence (a sequence immediately after the first sequence: a second sequence) in which the encoding is being performed.

Herein, in the first sequence SQ1, one image includes four pictures P11 to P14, and in the second sequence SQ2, one image includes five pictures P21 to P25.

For example, in the first picture P11 of the first sequence SQ1, the uppermost slice area S0 is an Intra-prediction area and has a large information amount, and the second to lowermost slice areas S1 to S3 are Inter-prediction areas and have a small information amount.

In other words, the following description relates to the case of refreshing (making a round of an Intra-area) a sequence over four pictures (frames); however, it goes without saying that the application of the present embodiment is not limited to a process of slicing one image into four.

In the first sequence SQ1, one image includes the four pictures P11 to P14, but in the fourth picture P14, an Intra-area exceeds a size (a target information amount) decided in advance. In other words, in the first sequence SQ1, the Intra-area Rof in the fourth picture P14 protrudes upward beyond a target information amount TIQ which is an upper limit.

In addition, for example, as with the first sequence SQ1, when the Intra-area Rof in the fourth picture P14 exceeds the target information amount TIQ, since it is difficult to refresh an image, its Intra-image is discarded for example.

As described above, when the Intra-area exceeds the target information amount, a process based on information (a generated information amount of an Intra-slice and a generated information amount of an Intra-slice line number and an entire picture) in the first sequence SQ1 is performed in the second sequence SQ2 next to the first sequence SQ1.

For example, when a moving image of 30 frames (images) for one second is assumed, since an image change between adjacent frames is small, it is considered to preferably perform a process in the second sequence SQ2 based on the information of the first sequence. Therefore, for example, as with the first sequence SQ1, when the Intra-area Rof in the fourth picture P14 exceeds the target information amount TIQ, one image is configured to include the five pictures P21 to P25 and the Intra-area is divided in the second sequence SQ2.

In other words, in the second sequence SQ2, slice pre-processing is performed between the third picture P23 and the fourth picture P24, thereby controlling the Intra-area of all the pictures P21 to P25 in the second sequence SQ2 not to exceed the target information amount TIQ.

Herein, in the slice pre-processing, for example, an Intra-slice line number corresponding to La is obtained from a predicted information amount in the fourth picture P14 of the first sequence SQ1 once, but since the information amount exceeds by Lb, the Intra-slice line number is further reduced.

In other words, in the fourth picture P24 and the fifth picture P25 of the second sequence, a line number of Intra-prediction is reduced and the two pictures P24 and P25 are allocated to P14 of SQ1, so that an information amount of Intra-prediction in each picture is configured to be reduced.

As described above, in the present embodiment, after the first sequence SQ1, the Intra-slice line number is controlled such that the Intra-prediction (Intra-slice) Sd1 and Sd2 of the fourth and fifth pictures P24 and P25 in the second sequence SQ2, in which encoding is actually performed, does not exceed the target information amount. In addition, an Inter-slice line number is obtained by subtracting the Intra-slice line number from a line number per one picture.

When it is generalized, the Intra-slice line number of the second sequence is defined as N and the Inter-slice line number of the second sequence is defined as M, so that M and N can be obtained by the following calculation formulas.

$$N \times I_{intra}/L_{intra} + M \times I_{inter}/L_{inter} = P_{total}$$

$$N + M = L_{total}$$

In the aforementioned calculation formulas, $I_{intra}$ denotes an Intra-generated information amount of an Intra-slice of the first sequence, $I_{inter}$ denotes an Inter-generated information amount of the first sequence, $L_{intra}$ denotes an Intra-slice line number of the first sequence, and $L_{inter}$ denotes an Inter-slice line number of the first sequence. Furthermore, $L_{total}$ denotes a line number per one picture and $P_{total}$ denotes a target information amount per one picture.

Herein, for example, $I_{intra}/L_{intra}$ denotes a generated information amount of Intra per one line in the fourth picture P14 of the first sequence, and $I_{inter}/L_{inter}$ denotes a generated information amount of Inter per one line in the fourth picture P14 of the first sequence.

In other words, for example, by $N \times I_{intra}/L_{intra}$, a generated information amount of entire Intra in the picture P14 is indicated, and by $M \times I_{inter}/L_{inter}$, a generated information amount of entire Inter in the picture P14 is indicated.

In this way, for example, in the same fourth pictures P14 and P24, the Intra-slice line number N of the second sequence can be calculated (estimated) by adding a limitation based on the target information amount $P_{total}$ per one picture.

In other words, firstly, in order to prevent the Intra-prediction Sd1 of the fourth picture P24 in the second sequence SQ2 from exceeding the target information amount, the Intra-slice line number is estimated. Moreover, in order to prevent the Intra-prediction Sd2 of the fifth picture P25 in the second sequence SQ2 from exceeding the target information amount, the Intra-slice line number is estimated.

In addition, in order to prevent the Intra-prediction Sd1 and Sd2 of the fourth and fifth pictures P24 and P25 in the second sequence SQ2 from exceeding the target information amount $P_{total}$, the Intra-slice line number is estimated and then correction based on Intra-activity ActN is performed. In addition, the Intra-activity will be described in detail later with reference to FIG. 3 and subsequent drawings.

As described above, according to the present embodiment, since the generated information amount of the Intra-slice is dominant in the encoding, the Intra-slice line number is reduced, so that the generated information amount per one picture can be allowed to converge to the target information amount. In other words, according to the present embodiment, it is possible to reduce delay in video encoding, i.e., encoding delay from video input to stream output while suppressing image quality degradation.

Figure 2:
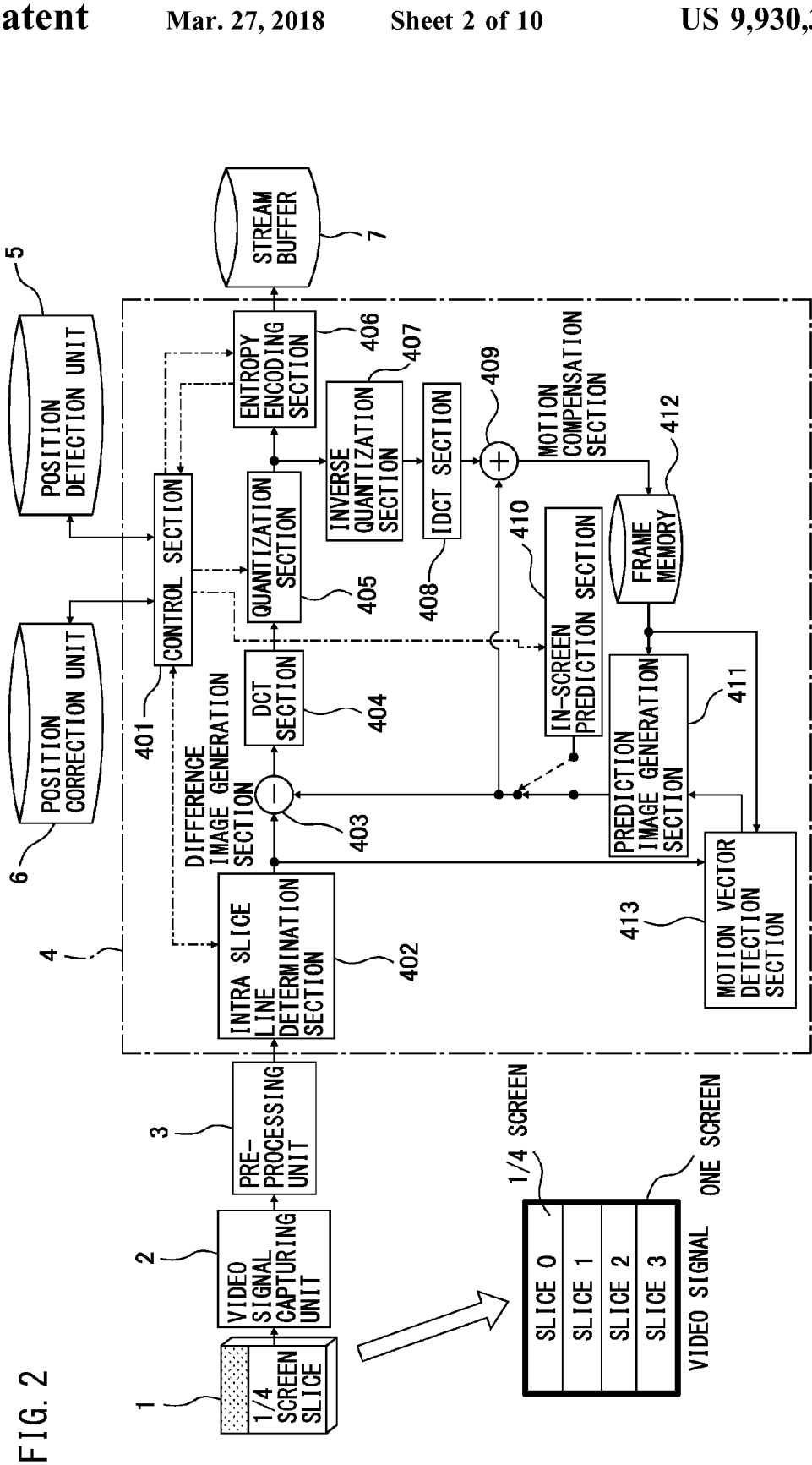
FIG. 2 is a block diagram illustrating an example of an image encoding apparatus according to the present embodiment.

FIG. 2 is a block diagram illustrating an example of an image encoding apparatus according to the present embodiment. In FIG. 2, a reference numeral 1 denotes an image processing unit (image processor), a reference numeral 2 denotes a video signal capturing unit, a reference numeral 3 denotes a pre-processing unit (pre-processor), and a reference numeral 4 denotes an image encoding unit (image encoder).

Moreover, a reference numeral 5 denotes a buffer for information of a previous sequence (a buffer for first information), a reference numeral 6 denotes a buffer for temporary information (a buffer for second information), and a reference numeral 7 denotes a stream buffer. In addition, the image encoding apparatus illustrated in FIG. 2, for example, is realized as an integrated circuit such as LSI.

The image processing unit 1 processes an image (a video signal) obtained via an optical system (not illustrated) and an imaging element (a CMOS image sensor: not illustrated), and for example, slices one screen by ¼, and generates and outputs a video signal of a ¼ screen.

The video signal capturing unit 2 captures a video signal (the video signal of the ¼ screen) from the image processing unit 1 and outputs the video signal to the pre-processing unit 3. The pre-processing unit 3 performs pre-processing to be described in detail later, and outputs a pre-processed signal to the image encoding unit 4.

The image encoding unit 4 performs data exchange between the buffer 5 for information of a previous sequence and the buffer 6 for temporary information, which will be described in detail later, performs an encoding process of an image (a video), generates stream data, and outputs the stream data to the stream buffer 7.

As illustrated in FIG. 2, the image encoding unit 4 includes a control section (a processing device) 401, an Intra-slice line determination section 402, a difference image generation section 403, a DCT (Discrete Cosine Transformation) section 404, a quantization section 405, an entropy encoding section 406, and an inverse quantization section 407.

Moreover, the image encoding unit 4 includes an IDCT (Inverse Discrete Cosine Transformation) section 408, a motion compensation section 409, an in-screen prediction section 410, a prediction image generation section 411, a frame memory 412, and a motion vector detection section 413.

Herein, the image encoding unit 4 of the image encoding apparatus of the present embodiment is provided with the Intra-slice line determination section 402 that receives the output of the aforementioned pre-processing unit 3 and performs determination of an Intra-slice line.

Furthermore, the control section 401 exchanges data between the buffers 5 and 6, exchanges signals between the Intra-slice line determination section 402 and the control section 401, and controls the quantization section 405, the entropy encoding section 406, the in-screen prediction section 410 and the like. In addition, the control section 401 also receives signals from the entropy encoding section 406.

Herein, since the difference image generation section 403, the DCT section 404, the quantization section 405, the entropy encoding section 406, the inverse quantization section 407, and the IDCT section 408 are generally known, a description thereof will be omitted.

Moreover, since the motion compensation section 409, the in-screen prediction section 410, the prediction image generation section 411, the frame memory 412, and the motion vector detection section 413 are also generally known, a description thereof will be omitted. In addition, FIG. 2 is a simple example of the image encoding apparatus, and it goes without saying that the image encoding apparatus of the present embodiment can be variously modified and changed.

FIG. 3 is a flowchart for explaining an example of a procedure in a sequence of first round, and FIG. 4A and FIG. 4B are diagrams for explaining a buffer process in the flowchart illustrated in FIG. 3.

With reference to FIG. 2 and FIG. 3, a procedure in a sequence (a first sequence) of first round in which there is no previous sequence information will be described. When the procedure in the first sequence is started, a video signal of a ¼ screen obtained by slicing one screen by ¼ by the image processing unit 1 is captured in the video signal capturing unit 2 (ST10).

Then, it is determined whether the video signal of the ¼ screen is an Intra-slice (ST11), and when it is determined that the video signal of the ¼ screen is not the Intra-slice (No), Inter-encoding is performed on the captured ¼ screen (ST12). Moreover, a generated information amount when the Inter-encoding has been performed is acquired (ST13) and the procedure in the first sequence is ended.

In other words, in step ST11, when it is determined that the captured ¼ screen is not the Intra-slice, the Inter-encoding is performed by the image encoding unit 4 similarly to a general process. In addition, the generated information amount when the Inter-encoding has been performed is configured to be acquired by the control section 401 via the entropy encoding section 406.

On the other hand, in step ST11, when it is determined that the captured ¼ screen is the Intra-slice (Yes), Intra-activity ActN is acquired by the pre-processing unit 3 (ST14).

Herein, the Intra-activity ActN used in processes after step ST14, for example, may also employ any statistical information if the complexity of a screen can be known by the statistical information.

Furthermore, as a determination formula of the Intra-slice in the aforementioned step ST11, any determination formulas may also be employed if the determination formulas can adaptively calculate (correct) an Intra-slice line number N in response to the complexity of a screen of an Intra-slice part. This is also similar in procedures in sequences of second round and subsequent round which will be described later.

Next, the Intra-slice line number (the line number of the Intra-slice) N is employed as a line number of the captured ¼ screen by the Intra-slice line determination section 402 (ST15), and a remaining line number N' of the Intra-slice is initialized to 0 (ST16).

Moreover, the captured ¼ screen is subjected to Intra-encoding (ST17), and the information (the Intra-slice line number N, the generated information amount, and the Intra-activity ActN) of the Intra-slice this time is stored in the buffer 5 for information of a previous sequence (the buffer for first information) (ST18).

For example, the information stored in the buffer 5 in step ST18 is the Intra-slice line number $L_{intra}$-0 to $L_{intra}$-3, the generated information amount $I_{intra}$-0 to $I_{intra}$-3, and the Intra-activity $ACT_{intra}$-0 to $ACT_{intra}$-3 for slices 0 to 3 as illustrated in FIG. 4A.

Herein, the slices 0 to 3, for example, correspond to the slice areas S0 to S3 of the picture P11 of the first sequence SQ1 in the aforementioned FIG. 1. Furthermore, the information of the Intra-slice this time (of the first sequence), which is stored in the buffer 5, is used in the procedure of the next sequence (the second sequence).

Then, the buffer 6 for temporary information (the buffer for second information) is cleared to 0 (ST19), and the procedure in the first sequence is ended. In other words, in step ST19, as illustrated in FIG. 4B, all of the Intra-slice line number tmpL$_{intra}$-X, the generated information amount tmpI$_{intra}$-X, and the Intra-activity tmpACT$_{intra}$-X for a slice X in the buffer 6 for temporary information are cleared to 0. In this way, the buffer 6 for temporary information is initialized.

Figure 5:
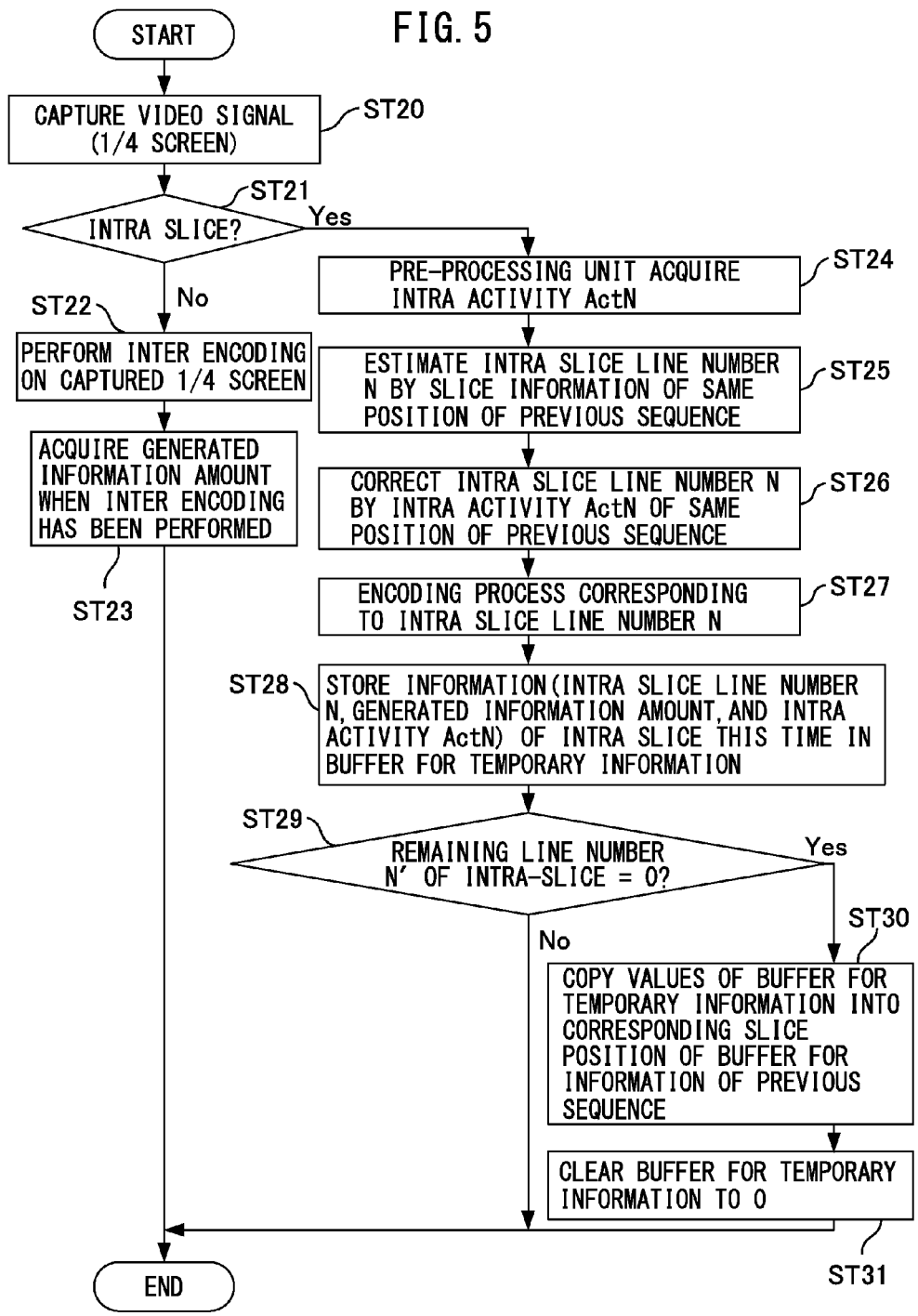
FIG. 5 is a flowchart for explaining an example of a procedure in a sequence of second round and subsequent round.

FIG. 5 is a flowchart for explaining an example of a procedure in a sequence of second round and subsequent round, and FIG. 6A and FIG. 6B are diagrams for explaining a buffer process in the flowchart of FIG. 5.

With reference to FIG. 2 and FIG. 5, a procedure in a sequence (a second sequence) of second round and subsequent round in which there is previous sequence information will be described. When the procedure in the second sequence is started, a video signal of a ¼ screen obtained by slicing one screen by ¼ by the image processing unit 1 is captured in the video signal capturing unit 2 (ST20).

Then, it is determined whether the video signal of the ¼ screen is an Intra-slice (ST21), and when it is determined that the video signal of the ¼ screen is not the Intra-slice (No), Inter-encoding is performed on the captured ¼ screen (ST22). Moreover, a generated information amount when the Inter-encoding has been performed is acquired (ST23) and the procedure in the second sequence is ended.

In other words, in step ST21, when it is determined that the captured ¼ screen is not the Intra-slice, a process similar to that in the sequence (the first sequence) of the first round described with reference to FIG. 3 is performed.

On the other hand, in step ST21, when it is determined that the captured ¼ screen is the Intra-slice (Yes), Intra-activity ActN is acquired by the pre-processing unit 3 (ST24).

Herein, in the second sequence (the sequence of second round and subsequent round), since the information of the Intra-slice based on the previous sequence has been stored in the buffer 5 for information of a previous sequence, the Intra-slice information in the previous sequence is used.

In other words, by slice information of the same position of the previous sequence (the first sequence), the Intra-slice line number N is estimated (ST25). Herein, FIG. 6A illustrates the Intra-slice information used in step ST25, and illustrates the information obtained by reading the Intra-slice information stored in the buffer 5 in step ST18 in the procedure of the previous sequence (the first sequence) illustrated in FIG. 4A.

For example, when a slice to be processed this time is a slice 0, data D01 (the Intra-slice line number L$_{intra}$-0 and the generated information amount I$_{intra}$-0 for the slice 0) of the slice 0 in FIG. 6A is read from the buffer 5, and the Intra-slice line number N is estimated.

Then, by the Intra-activity ActN of the same position of the previous sequence, the Intra-slice line number N is corrected (ST26). Herein, for example, when a slice to be processed this time is the slice 0, the Intra-activity Act$_{intra}$-0 of the slice 0 in FIG. 6A is read from the buffer 5, and the Intra-slice line number N is corrected using the Intra-activity Act$_{intra}$-0 together with the Intra-activity ActN acquired in step ST24. Moreover, an encoding process corresponding to the Intra-slice line number N is performed (ST27).

In addition, the Intra-activity correction process (a correction process of N) in step ST26 will be described in detail later with reference to FIG. 7 and FIG. 8, and the encoding process in step ST27 will be described in detail later with reference to FIG. 9 and FIG. 10.

Next, the information (the Intra-slice line number N, the generated information amount, and the Intra-activity ActN) of the Intra-slice this time is stored in the buffer 6 for temporary information (ST28).

In other words, in step ST28, as illustrated in FIG. 6B, the Intra-slice line number tmpL$_{intra}$-X, the generated information amount tmpI$_{intra}$-X, and the Intra-activity tmpACT$_{intra}$-X for the slice X is stored in the buffer 6 for temporary information.

Moreover, it is determined whether a remaining line number N' of the Intra-slice is 0 (ST29). Herein, in step ST29, when N' is not 0 (No), i.e., when it is determined that there is the remaining line number N' of the Intra-slice, the procedure is ended.

On the other hand, in step ST29, when N' is 0 (Yes), i.e., when it is determined that there is no remaining line number N' of the Intra-slice, values of the buffer 6 for temporary information are copied into a corresponding slice position of the buffer 5 for information of a previous sequence (ST30).

For example, when the corresponding slice position is a slice 3, the values (tmpL$_{intra}$-X, tmpI$_{intra}$-X, and tmpAct$_{intra}$-X) stored in the buffer 6 for temporary information illustrated in FIG. 6B are copied as data D31 of the slice 3 of the buffer 5 for information of a previous sequence illustrated in FIG. 6A.

Then, the buffer 6 for temporary information is cleared to 0 and is initialized (ST31), and the procedure is ended. In addition, the information (data) of the Intra-slice stored in the buffer 5 for information of a previous sequence is used in the procedure of the next sequence (corresponding to the second sequence) by this sequence (corresponding to the first sequence) in a similar manner.

FIG. 7 is a flowchart for explaining in more detail the Intra-activity correction process (the process of step ST26) in the flowchart of FIG. 5, and FIG. 8 is a diagram for explaining the buffer process in the flowchart of FIG. 7.

As described above, in step ST26, when the correction of the Intra-slice line number N by the Intra-activity ActN of the same position of the previous sequence, i.e., the correction process of N is started, the Intra-slice line number of a slice of the same position of the previous sequence is firstly acquired (ST40).

Herein, for example, when the process of the slice 0 is performed this time, the Intra-slice line number L$_{intra}$-0 (data D03) of the slice 0 in the buffer 5 for information of a previous sequence illustrated in FIG. 8 is read and acquired.

Moreover, the Intra-activity ActN of the slice of the same position of the previous sequence is acquired (ST41). Herein, when the process of the slice 0 is performed this time, the Intra-activity Act$_{intra}$-0 (data D04) of the slice 0 in the buffer 5 for information of a previous sequence illustrated in FIG. 8 is read and acquired.

Then, activity CIAPL around an Intra-slice line number this time is calculated as ActN/N=CIAPL (ST42), and activity PIAPL around an Intra-slice line number of a previous sequence is calculated as Act$_{intra}$-0/numberL$_{intra}$-0=PIAPL (ST43).

Next, it is determined whether CIAPL>PIAPL is established (ST44), and when it is determined that CIAPL>PIAPL is established (Yes), X=CIAPL/PIAPL (ST45), the Intra-slice line number N is calculated as N/X (ST46), and the procedure is ended. Herein, in the calculation of CIAPL/PIAPL in step ST45, for example, numerals after the decimal point are assented to be rounded up.

On the other hand, in step ST44, when it is determined that CIAPL>PIAPL is not established (No), X=PIAPL/CIAPL (ST47), the Intra-slice line number N is calculated as N*X (ST48), and the procedure is ended. Herein, in the calculation of PIAPL/CIAPL in step ST47, for example, numerals after the decimal point are assented to be rounded down.

In this way, it is possible to perform a correction process based on the Intra-activity with respect to the Intra-slice line number N estimated using the Intra-slice information in the previous sequence (the first sequence).

As described above, according to the present embodiment, when the line number is decided, correction based on a difference between Intra-activity calculated from information of a past picture serving as a basis and Intra-activity of a current slice is performed, so that it is also possible to cope with a scene change for example. In addition, the flowchart illustrated in FIG. 7 is a simple example, and as the correction process based on the Intra-activity, various correction processes can be applied.

Figure 9:
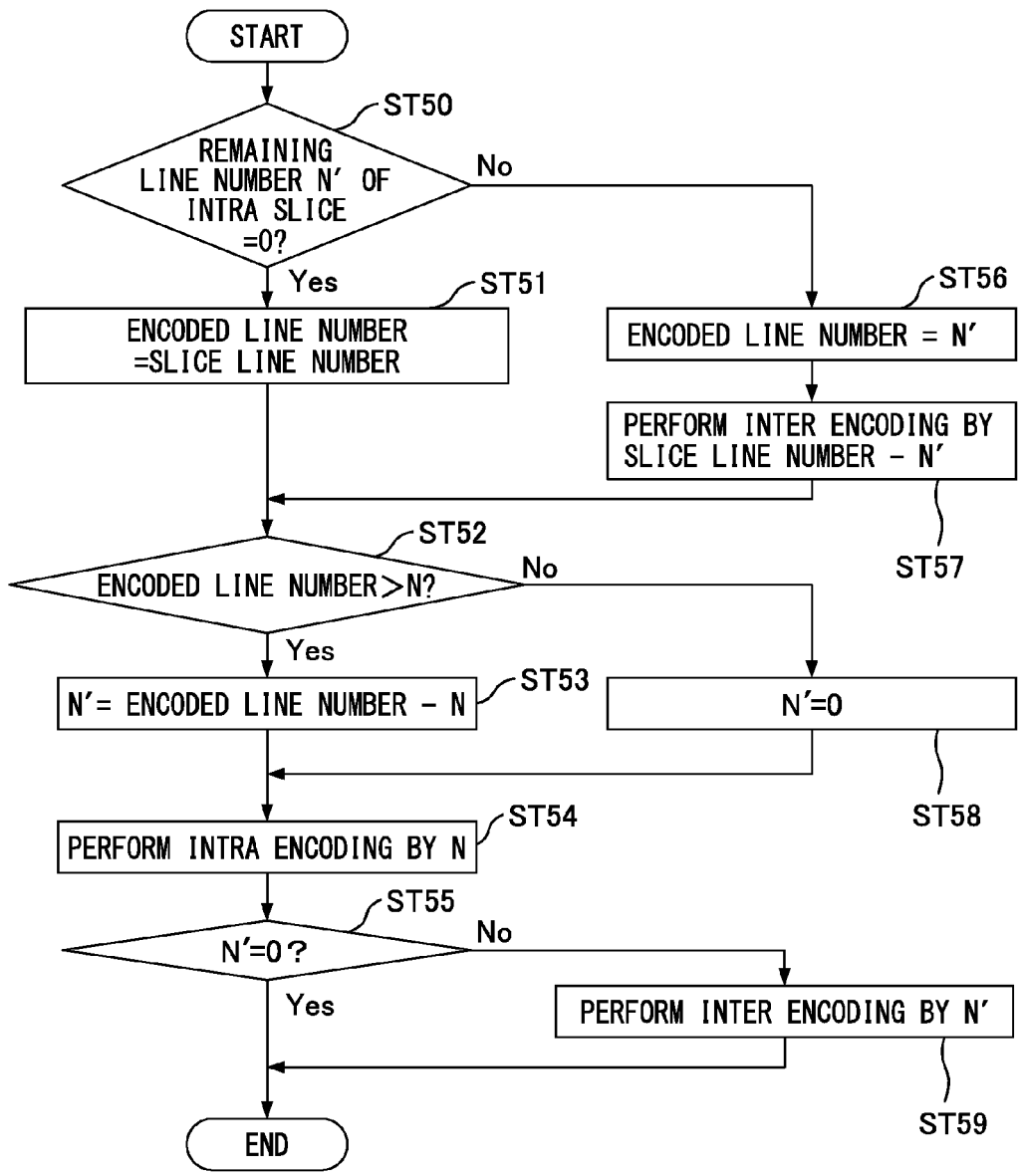
FIG. 9 is a diagram for explaining in more detail an encoding process in a flowchart of FIG. 5.
Figure 10:
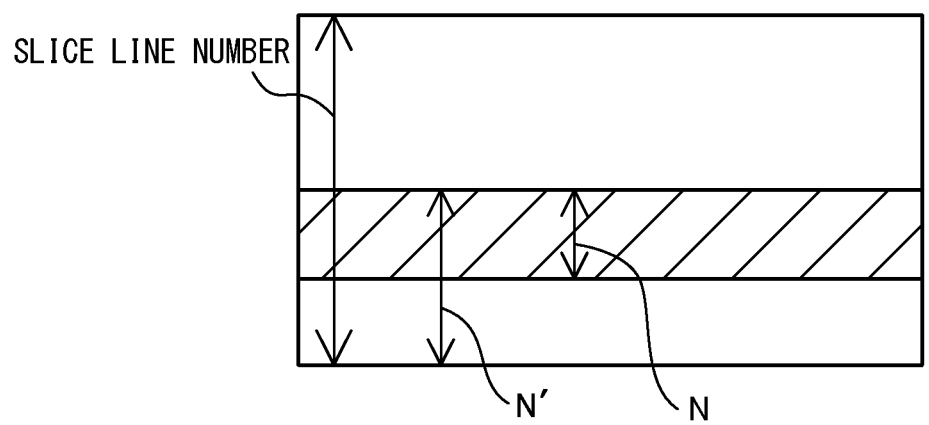
FIG. 10 is a diagram for explaining a slice image in a flowchart of FIG. 9.

FIG. 9 is a diagram for explaining in more detail the encoding process (the process of step ST27) in the flowchart of FIG. 5, and FIG. 10 is a diagram for explaining a slice image in the flowchart of FIG. 9.

As described above, in step ST27, when an encoding process corresponding to the Intra-slice line number N is performed, it is determined whether a remaining line number N' of the Intra-slice is equal to 0 (ST50).

In step ST50, when it is determined that N'=0 is established (Yes), an encoded line number is employed as a slice line number (ST51) and it is determined whether the encoded line number>N is established (ST52).

On the other hand, when it is determined that N'=0 is not established in step ST50, the encoded line number is employed as N' (ST56), Inter-encoding is performed by the slice line number-N', and the procedure proceeds to step S52. Herein, the slice line number, the Intra-slice line number N, and the remaining line number N' of the Intra-slice, for example, have a relation as illustrated in FIG. 10.

In step ST52, when it is determined that the encoded line number>N is established (Yes), N' is employed as the encoded line number-N (ST53), and Intra-encoding is further performed by N (ST54). Furthermore, in step ST52, when it is determined that the encoded line number>N is not established (No), N' is employed as 0 (ST58), and the Intra-encoding is further performed by N (ST54).

Then, it is determined again whether N'=0 is established (ST55). In step ST55, when it is determined that N'=0 is established (Yes), the procedure is ended as is, and when it is determined that N'=0 is not established (No), the Inter-encoding is performed by N' (ST59) and then the procedure is ended. In addition, the aforementioned encoding process (the process of step ST27) is a simple example, and it goes without saying that various modifications and changes can be made.

As described above, according to the present embodiment, before encoding is performed, prediction using a generated information amount of a previous sequence and correction based on Intra-activity are performed in advance, so that it is possible to decide an Intra-slice line number. In this way, it is not necessary to perform a process of reducing the allocation of an information amount of a subsequent image because an excessive information amount is generated during encoding, so that it is possible to reduce encoding delay while suppressing the degradation of image quality.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations can be made hereto without departing from the spirit and scope of the invention.

What is claimed is:

1. An image encoding apparatus configured to perform image encoding based on a gradual decoder refresh scheme, the image encoding apparatus comprising:
  a pre-processor configured to receive a video signal obtained by slicing one screen into a plurality of sub-screens and perform pre-processing; and
  an image encoder configured to receive output of the pre-processor, perform an encoding process, and generate stream data,
  wherein the image encoder is configured to acquire information of a first Intra-slice corresponding to a target Intra-slice in a first sequence with respect to the target Intra-slice in a second sequence, in which encoding is performed, after the first sequence; and is configured to estimate an Intra-slice line number and an Inter-slice line number of the second sequence not to exceed a target information amount based on the acquired information of the first Intra-slice, and
  wherein:
  the image encoder is configured to acquire information of an Intra-generated information amount of the first sequence and an Intra-slice line number of the first sequence as the information of the first Intra-slice, and
  the image encoder is configured to obtain the Intra-slice line number N and the Inter-slice line number M of the second sequence by a following expression:

$N \times I_{intra}/L_{intra} + M \times I_{inter}/L_{inter} = P_{total}$, $N+M=L_{total}$ where $I_{intra}$ denotes an Intra-generated information amount of the first sequence, $I_{inter}$ denotes an Inter-generated information amount of the first sequence, $L_{intra}$ denotes an Intra-slice line number of the first sequence, $L_{inter}$ denotes an Inter-slice line number of the first sequence, $L_{total}$ denotes a line number per one picture, and $P_{total}$ denotes a target information amount per one picture.

2. The image encoding apparatus as claimed in claim 1, the image encoding apparatus further comprising:
  a buffer for first information configured to hold the Intra-generated information amount of the first sequence, the Intra-slice line number of the first sequence, and Intra-activity of the first sequence.

3. The image encoding apparatus as claimed in claim 2, the image encoding apparatus further comprising:
  a buffer for second information configured to hold an Intra-generated information amount of the second sequence, an Intra-slice line number of the second sequence, and Intra-activity of the second sequence.

4. The image encoding apparatus as claimed in claim 3, wherein the image encoder is configure to further detect a difference between the Intra-activity of the first sequence and the Intra-activity of the second sequence.

5. The image encoding apparatus as claimed in claim 3, wherein when the Intra-activity of the second sequence is larger than the Intra-activity of the first sequence, the image encoder is configure to decrease the Intra-slice line number N of the second sequence obtained from the calculation formula; and is configure to increase the Inter-slice line number M of the second sequence according to the decrease in the Intra-slice line number N of the second sequence.

6. The image encoding apparatus as claimed in claim 1, wherein the image encoder is configured to:
    acquire Intra-activity of the first sequence with respect to the first Intra-slice;
    acquire Intra-activity of the second sequence with respect to the target Intra-slice; and
    detect a difference between the Intra-activity of the first sequence and the Intra-activity of the second sequence.

7. The image encoding apparatus as claimed in claim 1, wherein the image encoder is configured to:
    acquire Intra-activity of the first sequence with respect to the first Intra-slice; is configured to acquire Intra-activity of the second sequence with respect to the target Intra-slice;
    decrease the Intra-slice line number N of the second sequence obtained from the calculation formula when the Intra-activity of the second sequence is larger than the Intra-activity of the first sequence; and
    increase the Inter-slice line number M of the second sequence according to the decrease in the Intra-slice line number N of the second sequence.

8. The image encoding apparatus as claimed in claim 1, wherein when the Intra-slice line number N of the second sequence is smaller than an encoded line number of the target Intra-slice, the image encoder is configured to:
    perform an encoding process corresponding to the Intra-slice line number N of the second sequence; and
    perform an encoding process corresponding to a difference between the Intra-slice line number N of the second sequence and the encoded line number of the target Intra-slice.

9. The image encoding apparatus as claimed in claim 1, wherein:
    the first Intra-slice is included in a first picture, in which an information amount of the first Intra-slice exceeds the target information amount, in the first sequence in which encoding for a plurality of pictures is performed, and
    the target Intra-slice is included in a second picture corresponding to the first picture in the second sequence in which encoding for a plurality of pictures is performed.

10. An image encoding method that performs image encoding based on a gradual decoder refresh scheme, the image encoding method comprising:
    acquiring, by an image encoder, information of a first Intra-slice corresponding to a target Intra-slice in a first sequence with respect to the target Intra-slice in a second sequence, in which encoding is performed, after the first sequence; and
    estimating, by the image encoder, an Intra-slice line number and an Inter-slice line number of the second sequence such that a target information amount is not exceeded, based on the acquired information of the first Intra-slice,
    wherein the Intra-slice line number N and the Inter-slice line number M of the second sequence are obtained by calculation formulas below, $$N \times I_{intra}/L_{intra} + M \times I_{inter}/L_{inter} = P_{total}$$

$$N + M = L_{total}$$

where $I_{intra}$ denotes an Intra-generated information amount of the first sequence, $I_{inter}$ denotes an Inter-generated information amount of the first sequence, $L_{intra}$ denotes an Intra-slice line number of the first sequence, $L_{inter}$ denotes an Inter-slice line number of the first sequence, $L_{total}$ denotes a line number per one picture, and $P_{total}$ denotes a target information amount per one picture.

11. The image encoding method as claimed in claim 10, wherein the image encoding method further comprises:
    acquiring Intra-activity of the first sequence with respect to the first Intra-slice;
    acquiring Intra-activity of the second sequence with respect to the target Intra-slice;
    decreasing the Intra-slice line number N of the second sequence obtained from the calculation formula when the Intra-activity of the second sequence is larger than the Intra-activity of the first sequence; and
    increasing the Inter-slice line number M of the second sequence according to the decrease in the Intra-slice line number N of the second sequence.

12. The image encoding method as claimed in claim 10, wherein the image encoding method comprises:
    performing an encoding process corresponding to the Intra-slice line number N of the second sequence when the Intra-slice line number N of the second sequence is smaller than an encoded line number of the target Intra-slice, and then performing an encoding process corresponding to a difference between the Intra-slice line number N of the second sequence and the encoded line number of the target Intra-slice.

13. A non-transitory computer-readable medium storing an image encoding program that performs image encoding based on a gradual decoder refresh scheme, causing a processing device to execute processes comprising:
    acquiring information of a first Intra-slice corresponding to a target Intra-slice in a first sequence with respect to the target Intra-slice in a second sequence, in which encoding is performed, after the first sequence; and
    estimating an Intra-slice line number and an Inter-slice line number of the second sequence such that a target information amount is not exceeded, based on the acquired information of the first Intra-slice,
    wherein the processes further comprises:
    obtaining the Intra-slice line number N and the Inter-slice line number M of the second sequence by calculation formulas below, $$N \times I_{intra}/L_{intra} + M \times I_{inter}/L_{inter} = P_{total}$$

$$N + M = L_{total}$$

where $I_{intra}$ denotes an Intra-generated information amount of the first sequence, $I_{inter}$ denotes an Inter-generated information amount of the first sequence, $L_{intra}$ denotes an Intra-slice line number of the first sequence, $L_{inter}$ denotes an Inter-slice line number of the first sequence, $L_{total}$ denotes a line number per one picture, and $P_{total}$ denotes a target information amount per one picture.

14. The non-transitory computer-readable medium storing the image encoding program as claimed in claim 13, wherein the processes further comprises:
    acquiring Intra-activity of the first sequence with respect to the first Intra-slice;

acquiring Intra-activity of the second sequence with respect to the target Intra-slice;

decreasing the Intra-slice line number. N of the second sequence obtained from the calculation formula when the Intra-activity of the second sequence is larger than the Intra-activity of the first sequence; and increasing the Inter-slice line number M of the second sequence according to the decrease in the Intra-slice line number N of the second sequence.

15. The non-transitory computer-readable medium storing the image encoding program as claimed in claim 13, wherein the image encoding program causes the processing device to execute processes comprising:

performing an encoding process corresponding to the Intra-slice line number N of the second sequence when the Intra-slice line number N of the second sequence is smaller than an encoded line number of the target Intra-slice, and then performing an encoding process corresponding to a difference between the Intra-slice line number N of the second sequence and the encoded line number of the target Intra-slice.

\* \* \* \* \*